UNITED STATES PATENT OFFICE.

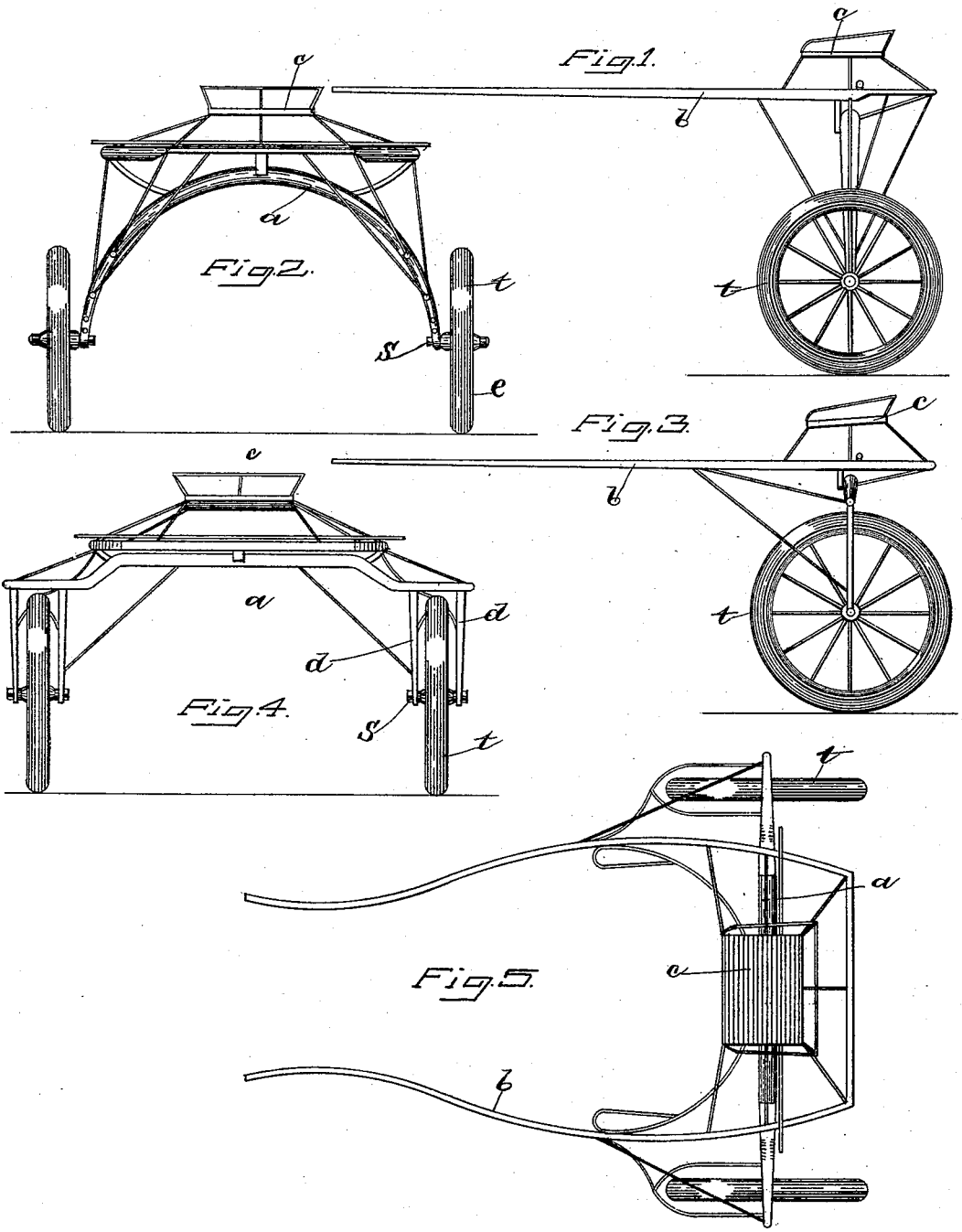

STERLING ELLIOTT, OF NEWTON, MASSACHUSETTS.

SULKY.

SPECIFICATION forming part of Letters Patent No. 494,113, dated March 21, 1893.

Application filed October 14, 1892. Serial No. 448,802. (No model.)

*To all whom it may concern:*

Be it known that I, STERLING ELLIOTT, of Newton, county of Middlesex, State of Massachusetts, have invented an Improvement in Sulkies, of which the following description, in connection with the accompanying drawings, is a specification, like letters on the drawings representing like parts.

In trotting sulkies as now commonly made the wheels are large in diameter, generally about fifty-six inches, and it has heretofore been considered essential to use wheels of such large diameter with the view of reducing the friction upon the axle. The use of such large wheels is attended with many objections, as they necessitate the employment of numerous spokes, which must be of such size that those spokes which are between the hubs and the ground shall be sufficient to support not only the direct weight of the seat and frame of the vehicle and of the rider, but also to resist the lateral strain to which the wheels are subjected. It is of course desirable to reduce in every possible way the weight of the sulky and therefore the large size of the wheels is a serious objection, and efforts have been made for many years to reduce the weight of the wheel by reducing the thickness of the spokes, but this is attended with the disadvantage, growing from the insufficient support afforded, that any increased lightness in the wheel is obtained at the expense of lateral vibration resulting from the thinness of the spokes, which lateral vibration is objectionable as it results in the wheels momentarily leaving the track, in unequalizing the bearing pressure of the hub upon the axle, causing it to bind and thereby increasing the friction upon said axle, while the resistance of the air is materially increased, and a disturbing effect produced upon the horse. Further, the reduction in the thickness of the spokes, for the purpose of securing light weight impairs the strength of the wheel, so that when the vehicle swings laterally in turning corners the strain tends to throw the rim to one side beneath the hub and causes the breaking of the wheel. For these reasons the weight cannot be decreased to anything like the extent desired. It has of course been known that by reducing the size of the wheels the weight could be reduced, but it has heretofore been supposed that any material reduction in size would result in such increased resistance to the movements of the wheels on the road as would more than offset any advantage from decreasing the weight.

One of the most serious obstacles to the perfect action of the horse in trotting with sulkies has been the tendency of the vehicle to "slew" or slide sidewise from the direct line of motion in turning corners or traveling around curves of the track, and when the wheels are light and liable to collapse from such lateral action the restraining influence upon the driver and the necessity of holding in the horse at such times acts upon both horse and driver to limit their efficiency. These facts have been well known and yet for many years no appreciable improvement has been devised that would overcome the various objections to the ordinary sulky above set forth.

I have discovered that, while a certain reduction in the size of the wheels for the purpose of reducing weight will not secure any advantage in view of the increased resistance to the movements of the wheel upon the track, but if the diameters of the wheels are reduced to a much greater extent than has ever before been proposed, the great reduction in weight thereby secured will far more than compensate for such increased resistance as consequentially results. While the diameter of the wheels may vary to some extent they should not under any circumstances be any higher than the distance between the shafts and the ground and in most instance a diameter equal to about three-fourths to two-thirds of the said distance will be found to be most effective, and with wheels of such size I am able to secure a very great reduction in weight without impairing the requisite rigidity and without producing any lateral vibrations, so that the vehicle will keep in the track; and with such wheels there is little resistance from the air and little disturbance attracting the attention of the animal. While the wheels of such greatly reduced size will thus overcome some of the serious objections to the ordinary construction of sulkies there is still the tendency, even with the use of such wheels, to slew in turning curves, which tendency I have discovered may be wholly overcome by placing elastic tires upon the wheels, preferably of such form that they will yield slightly laterally to the movements of the vehicle without any sliding action of the parts of the tires that bear directly upon the road. And I have discovered that if such elastic tires be used in the form of pneumatic tires a very great advantage can be obtained in this respect, while, further, the movements of the vehicle are so softened and reduced as to practically exert no disturbing influence upon the horse, and the driver is relieved of the necessity of being upon his guard and of restraining the action of the horse in any way in turning curves and consequently the full powers of both the driver and the animal may be exerted throughout the races. The result has been such that with a vehicle provided with wheels as above set forth it is possible to obtain a speed never heretofore secured upon racing tracks, and this is so fully recognized that in the few weeks that have elapsed since the first introduction of my improved sulky the old forms of trotting sulkies have practically become obsolete and discarded.

The improved sulkies may of course be made with frames, seats, shafts or poles and wheels of different constructions.

In the accompanying drawings Figure 1, is the side view of one form of sulky embodying my improvements. Fig. 2, is a rear end elevation thereof. Fig. 3, is a side elevation of another form. Fig. 4, is a rear end elevation of the sulky shown in Fig. 3, and Fig. 5, a plan view of the construction shown in Figs. 3 and 4.

The shafts b, are preferably carried at the usual elevation, and constructed and braced in any usual manner, and the seat c is supported at its proper elevation, about the same as heretofore, and a cross pole may support the journals of suitable construction, or may be in the form of an arched axle a, as shown in Fig. 2, or may serve as a means of connecting bars or frames d, that support the journals as shown in Figs. 3 and 5. In any case the journals s, are adapted to receive the hubs of the wheels e, the diameters of which, as shown in Figs. 1 and 2, are about equal to two-thirds the distance between the shaft and the ground, the wheels being somewhat larger in diameter in Figs. 3 and 5, but the outside limit of size should be less than the distance between the shaft and the ground.

As shown the wheels are provided with ordinary pneumatic tires t, which may be secured in any suitable way and may be of any suitable construction, and the rims, spokes and hubs of the wheels may also be of any suitable construction and material.

I am aware that it has been proposed to put elastic tires upon the wheels of sulkies when such wheels are of the usual size, but no advantage whatever has resulted, because the addition of such tires with such wheels simply results in an increase in the weight, and the wheels must be made with spokes so thin that they are seriously lacking in rigidity, and the tendency to slew, even if overcome by the friction of the tire upon the track, results in breaking the wheel, and the added weight of the elastic tire at the upper portions of the sufficiently light wheels results in increasing the lateral vibrations of this portion of the wheel, so that practically the use of elastic tires in such cases is of no benefit but the reverse.

I do not here claim the construction and arrangement of the frame and axle or supports for the journals as shown in the drawings, as these features constitute the subjects of separate applications for Letters Patent Serial Nos. 436,758 and 436,759.

Without limiting myself to any specific form of frame or wheel or to the proportions shown, I claim as my invention—

1. The combination in a trotting sulky of a frame, shafts or pole and seat, and wheels less in diameter than the distance between the shafts and the ground, and provided with elastic tires, substantially as described.

2. The combination with the frame, shafts and seat of a sulky, of wheels less in diameter than the distance between the shafts and the ground, and provided with pneumatic tires, substantially as and for the purpose set forth.

In testimony whereof I have signed my name to this specification in the presence of two subscribing witnesses.

STERLING ELLIOTT.

Witnesses:
BERNICE J. NOYES,
LUCY F. GRAVES.